US007568886B2

(12) United States Patent
Hohmann et al.

(10) Patent No.: US 7,568,886 B2
(45) Date of Patent: Aug. 4, 2009

(54) METHOD AND DEVICE FOR IDENTIFYING THE STATE OF THE ROTOR OF A NON-POSITIVE-DISPLACEMENT MACHINE

(75) Inventors: Christian Hohmann, Mülheim an der Ruhr (DE); Reimar Schaal, Darmstadt (DE); Werner Setz, Rösrath (DE)

(73) Assignee: Siemens Aktiengesellschaft, Munich (DE)

( * ) Notice: Subject to any disclaimer, the term of this patent is extended or adjusted under 35 U.S.C. 154(b) by 453 days.

(21) Appl. No.: 10/592,768

(22) PCT Filed: Mar. 10, 2005

(86) PCT No.: PCT/EP2005/002560

§ 371 (c)(1),
(2), (4) Date: Sep. 14, 2006

(87) PCT Pub. No.: WO2005/093220

PCT Pub. Date: Oct. 6, 2005

(65) Prior Publication Data

US 2008/0145223 A1 Jun. 19, 2008

(30) Foreign Application Priority Data

Mar. 16, 2004 (EP) ................................. 04006256

(51) Int. Cl.
*F01D 5/02* (2006.01)
*G01M 15/14* (2006.01)

(52) U.S. Cl. ........................... 416/2; 416/61; 73/112.01

(58) Field of Classification Search .............. 73/112.01; 415/9, 118; 416/2, 61, 248
See application file for complete search history.

(56) References Cited

U.S. PATENT DOCUMENTS

| | | | | |
|---|---|---|---|---|
| 3,490,748 | A | 1/1970 | Hoffmann | |
| 4,796,465 | A * | 1/1989 | Carreno et al. | 415/118 |
| 2002/0019708 | A1 | 2/2002 | Pross | |

FOREIGN PATENT DOCUMENTS

| | | | |
|---|---|---|---|
| CN | 1184201 | | 6/1998 |
| DE | 199 62 735 | A1 | 6/2001 |
| EP | 0846844 | A1 * | 11/1997 |
| EP | 0846844 | A1 | 6/1998 |
| EP | 1 273 803 | A2 | 1/2003 |
| GB | 1 499 550 | | 2/1978 |

* cited by examiner

*Primary Examiner*—Richard Edgar

(57) ABSTRACT

The invention relates to a rotor of a non-positive-displacement machine which, when exposed, has an inspection area which is visible from the outside and inside of which a comparatively uncritical load occurs during the operation of the non-positive-displacement machine. In addition, the rotor, when exposed, has a monitoring area which is not visible from the outside and inside of which a comparatively critical load occurs during the operation of the non-positive-displacement machine. The rotor also has a weak point provided in the form of a predetermined breaking point having the shape of a notch and located in inspection area. In order to improve the reliability of the non-positive-displacement machine, a recess, particularly a release bore hole, is provided for delimiting the weak point, and the uncritical defect can terminate inside said release bore hole.

4 Claims, 2 Drawing Sheets

METHOD AND DEVICE FOR IDENTIFYING THE STATE OF THE ROTOR OF A NON-POSITIVE-DISPLACEMENT MACHINE

CROSS REFERENCE TO RELATED APPLICATIONS

This application is the US National Stage of International Application No. PCT/EP2005/002560, filed Mar. 10, 2005 and claims the benefit thereof. The International Application claims the benefits of European Patent application No. 04006256.4 filed Mar. 16, 2004. All of the applications are incorporated by reference herein in their entirety.

FIELD OF THE INVENTION

The invention relates to a rotor for a turbomachine, which in the exposed state has an inspection area visible from the outside, in which during the running of the turbomachine a comparatively uncritical stress occurs and which in the exposed state has a monitoring area not visible from the outside, in which during the running of the turbomachine a comparatively critical stress occurs, with a weak spot located in the inspection area in the fashion of a predetermined breaking point which is formed as a notch. Furthermore, the invention relates to a turbomachine according to the claims and to a method for identifying the condition of the rotor of a turbomachine according to the claims.

BACKGROUND OF THE INVENTION

From DE 19 96 27 35 A1 a method is made known for the monitoring of the creep behavior of rotating components of a compressor stage or turbine stage. During the process at least one test element is fastened to a component to be monitored in a region in which comparable temperatures and operating loads occur. After a predetermined running time the creep behavior of the test element is inspected in order to derive from it the creep behavior of the component to be monitored. The test element is formed as a partially tapered metal strip which in the region of the retaining slots for the turbine blades is welded on a rotor disk on the end face.

The embodiment shown therein is considered to be disadvantageous, since the metal strip can break off during operation and then lead to damage in the gas turbine.

Moreover, it is known that the components of the rotor of a gas turbine are previously inspected for defects before their assembly in order to avoid damage which can occur during the running of the gas turbine. The rotor is built from a plurality of adjoining rotor disks and a tension bolt. In addition to the thermal stresses it is especially subjected to mechanical stresses arising as a result of centrifugal force so therefore its components are inspected for defects.

The rotor disks in particular are inspected by the known material tests, such as ultrasound for example, for defects which appear as indications, which can be present after the manufacture of the rotor disks. By this, the indications point out defects, foreign material inclusions, inhomogeneities in the material structure or even cracks. The rotor disks identified as indication-free after this initial test are then used for building the rotor. Indication-free signifies that in fact no defects are present or that defects present in the components are so small that theoretically according to a fracture mechanical calculation during the running of the gas turbine no critical cracks can originate and propagate from them.

Despite the initial test of the rotor disks, these can have defects that are unidentified or underestimated in their effect, so that, for reasons of operational reliability, after a predetermined number of starts the gas turbine is opened for service purposes and the rotor inspected in a repeat test.

The rotors have to be destacked for the test, that means being stripped down into their rotor components in order to inspect for cracks the areas of the rotor disks inside the rotor which are not externally visible and therefore not inspectable.

For the check of the individual rotor disks for cracks the already known methods are used once again.

Furthermore, it is known that by means of a deterministic analysis the permissible number of starts of the gas turbine can be determined, after which a check of the rotor components for defects is to be undertaken. With this, the fracture mechanical boundary conditions and the assumed operating stresses are selected so that the permissible number of starts is conservatively planned, in other words the permissible number of starts is underestimated.

For that purpose FIG. 5 shows a number of starts-crack length graph according to the prior art.

Shown is the propagation behavior of a crack in a rotor disk. The characteristic curve 51 in this is determined according to the aforesaid analysis. With increasing numbers of starts the crack length a increases superproportionally. During operation, however, a crack should not exceed the calculated maximum permissible crack length $a_{zul}$.

In order to ensure the reliable running of the gas turbine a defect is assumed which theoretically initiates a crack propagation according to the characteristic curve 51. As the maximum permissible crack length $a_{zul}$ should not be exceeded, the permissible number of starts $N_{zul}$ can therefore be determined by means of the characteristic curve 51. No later than when the permissible number of starts $N_{zul}$ is reached, the rotor is stripped and the rotor disks inspected for defects.

The stripping and checking of the rotor increases, however, the duration of the service inspection and so reduces the availability of the gas turbine.

SUMMARY OF THE INVENTION

Accordingly it is the object of the present invention to specify a rotor for a turbomachine by which an increase of the availability of the turbomachine is achieved. In addition, it is the object of the invention, in this context, to specify a turbomachine and a method for identifying of the condition of a rotor.

The problem focused on the rotor is solved by the features of the claims, the problem focused on the turbomachine solved by the features of the claims, and the problem focused on the method solved by the features of the claims. Advantageous developments are specified in the dependent claims.

The solution to the problem focused on the rotor provides that for the limiting of the weak spot an opening, especially a relief drilling is provided, into which the uncritical defect can run out.

By the invention it is for the first time possible to observe the crack propagation of the components for monitoring themselves and not the crack propagation of an additional test element under the hitherto actual encountered stresses which were caused by the running mode, that it is to say especially by the starts of the turbomachine. To that end, in the inspection area comparatively uncritical for the integrity of the rotor disk a weak spot is located, from which an uncritical defect caused by the hitherto actual stress collective can propagate. Without the addition of an additional test element conclusions are drawn on the basis of the uncritical defect about a possible fracture mechanical damage of the rotor which lies in the monitoring area not visible from the outside.

The invention is based on the knowledge that the defects not recorded during the initial test, or toleranced defects, can initiate a crack propagation during the running of the turbomachine. By the weak spot provided according to the invention a defect can be purposefully introduced into the inspection area visible from the outside. From the weak spot an uncritical defect caused by the stress collective can then propagate. Only if, with the turbomachine opened and the rotor still assembled, an uncritical defect, of a length which exceeds a limit value is discovered in the inspection area, is the condition of the rotor then identified as "for checking". Only then is the stripping of the rotor and a detailed check of the rotor components necessary.

Consequently, the previous method was turned away from in which the criteria for the decision on the stripping of the rotor was derived from a deterministic analysis by the application of a conservative boundary condition. If it came to light during a check of the stripped rotor, components that no defect was present inside the rotor then the rotor was hitherto unnecessarily stripped and therefore the rotor components were unnecessarily checked.

Should none of the defects of the inspection areas exceed the limit value, then the stripping of the rotor and checking of the rotor components can be moved back from the time point of view which leads to an increase of the availability duration of the turbomachine and to a reduction of the service inspection costs.

Furthermore, for the limiting of the weak spot an opening, especially a relief drilling, is provided into which the uncritical defect can run out. A growth of the defect to a supercritical length and/or from out of the inspection area is, therefore, prevented.

According to an advantageous development the weak spot is constructed on an annular platform so that formed loads directed in the circumferential direction act upon this during the running of the turbomachine. Instead of a load acting in the radial direction, as in DE 19 96 27 35, an above-average improvement with regard to the comparability of the loads of the inspection area and monitoring area can be achieved by the load acting in the circumferential direction. By the elimination of the known metal strip damage also is avoided which could be caused by a detached metal strip in the turbomachine.

According to a development the rotor comprises a plurality of rotor disks and at least one tension bolt clamping the rotor disks. Should at least one of the rotor disks in the inspection area have a critical defect during the service inspection, then the rotor is to be stripped and at least the relevant components checked for defects.

The invention is especially advantageously applicable to welded or one-piece rotors as with these a stripping is indeed not possible but the condition of the rotor is determinable with regard to internal critical defects which could possibly lead to the failing of the rotor.

Expediently, a weak spot is provided at least on one of the rotor disks. Especially advantageous is the development in which each rotor disk has a weak spot. A part of the inspection areas covers a first service inspection interval, after which theoretically a destacking of the rotor and a check of the rotor disks would be necessary. For each additional service inspection interval further inspection areas with further weak spots and associated openings can be provided which bring about a crack propagation for the previous running mode. Consequently, the complete stress collective can act on the associated weak spot in order to be able to then draw conclusions for the whole rotor during the check of the inspection area.

Alternatively to that the inspection area could be formed in such a way that the weak spot with its associated relief drilling covers all inspection intervals. Consequently, during each inspection the actual crack length has to be recorded and compared with a predetermined permissible crack length allocated to the respective service inspection in order to determine the condition of the rotor.

In an advantageous further development the monitoring area is adjacent to a hub of the rotor disk as at this point higher stresses can occur during the running of the turbomachine. As the fracture mechanical damage occurs first in this area its monitoring is meaningful.

The solution to the problem focused upon the turbomachine proposes to form the rotor of this turbomachine as claimed in the claims.

The solution to the problem focused upon the method for identifying of the condition of the exposed rotor of a turbomachine proposes that first the inspection area of the rotor is inspected for a uncritical defect and, in the absence of a defect in the inspection area, the condition is determined as "not to be checked" or, in the presence of a defect the conclusion is drawn that another defect is located in the monitoring area, from which the condition of the rotor is then determined.

The advantages described for the rotor are valid at the same time analogously also for the turbomachine and the method.

BRIEF DESCRIPTION OF THE DRAWINGS

The invention is explained on the basis of a drawing, in which.

DETAILED DESCRIPTION OF THE INVENTION

Figure 6:
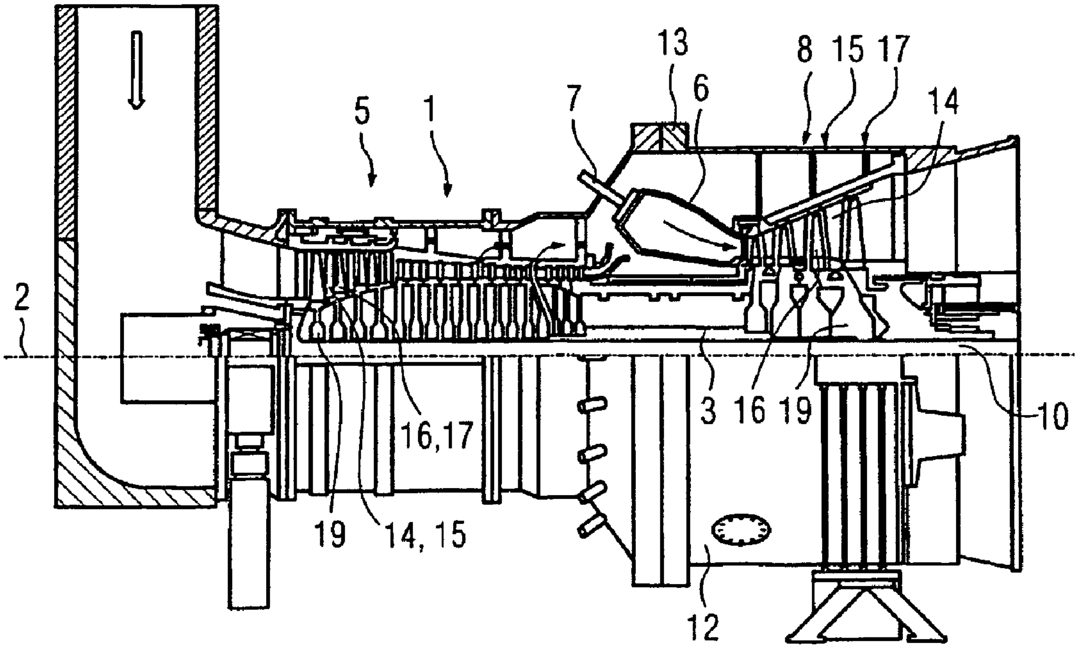

A gas turbine and its operating method is generally known. In relation to this FIG. 6 shows a gas turbine 1, a compressor 5 for combustion air, a combustion chamber 6, and a turbine 8 for driving both the compressor 5 and a working machine, for example, a generator. The turbine 8 and the compressor 5 are installed on a common rotor 3 designated as the turbine rotor to which the working machine is also connected, and which is mounted to rotate around its longitudinal axis. The combustion chamber 6 is fitted with burners 7 for the combustion of a liquid or gaseous fuel.

The gas turbine 1 has a torsionally fixed lower casing half 12 in which the assembled rotor 3 is installed during the assembly of the gas turbine 1. Then an upper casing half 13 is fitted to close the gas turbine 1.

The rotor 3 has a central tension bolt 10 which clamps a plurality of adjacent rotor disks 19 to one another.

Internally the compressor 5 and also the turbine 8 each have a number of rotatable rotor blades 16 connected to the rotor 3. The rotor blades 16 are installed in ring form on the annular rotor disks 19 and thus form a number of rotor blade rows 15. Furthermore, both the compressor 5 and the turbine 8 comprise a number of fixed stator blades 14 which similarly are fastened in ring form on an inner wall of the casing of the compressor 5 or turbine 8 to form stator blade rows 17.

Figure 1:
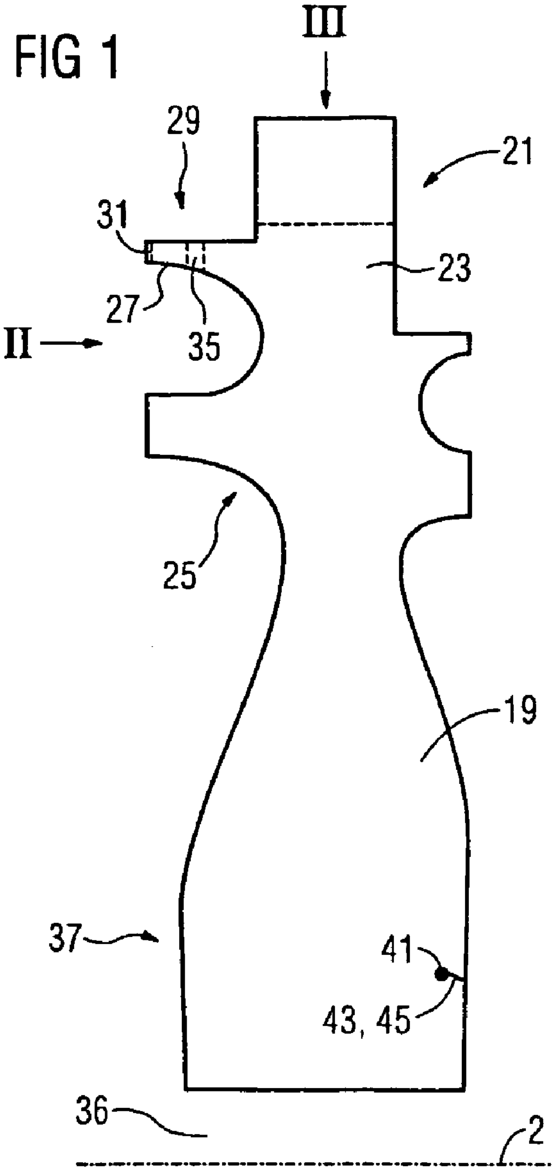
FIG. 1 shows a section through a rotor disk with a weak spot.
Figure 2:
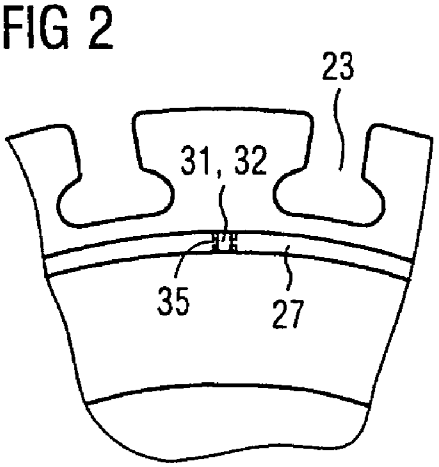
FIG. 2 shows the side view of the rotor disk according to FIG. 1.

FIG. 1 shows the section through the rotor disk 19 of a gas turbine 1 along its radius. Through the center point of the annular rotor disk 19, which can be formed as a compressor disk or as a turbine disk, extends the rotational axis 2 of the rotor 3. The rotor disk 19 has rotor blade retaining slots 23 for accommodating rotor blades 16 on its radially outer end 21. On one end face 25 of the rotor disk 19 a freely projecting platform 27 is provided. The platform 27 has an inspection area 29 which in the exposed state of the assembled rotor 3 is visible from the outside. The rotor 3 then lies in the lower half 12 of the casing of the gas turbine 1 and the upper half 13 of the casing is removed.

Figure 3:
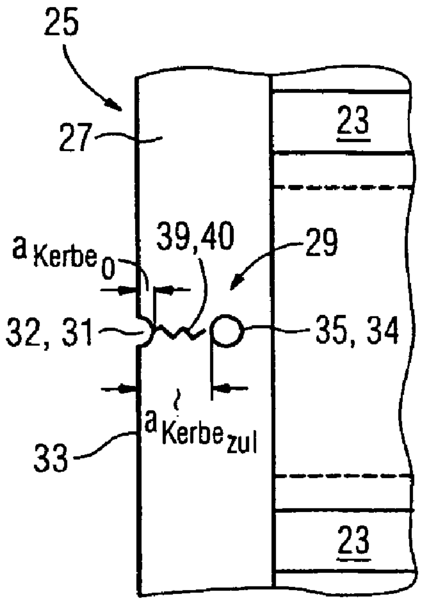
FIG. 3 shows the plan view on the circumference of the rotor disk according to FIG. 1.
Figure 5:
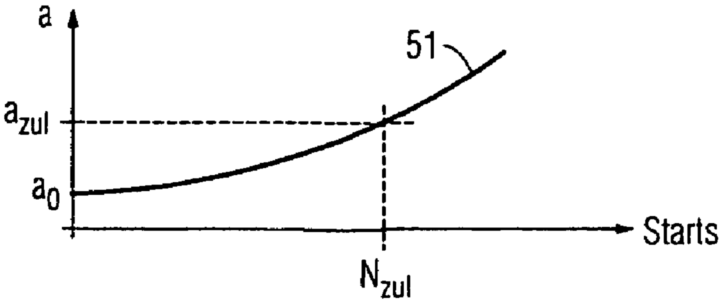
FIG 5 (Prior art)
FIG. 5 shows a number of starts-crack length graph according to the prior art and FIG. 6 shows a longitudinal partial section through a gas turbine.

FIG. 3 shows the inspection area 29 with a weak spot 31 which is formed as a notch 32 with notch length $a_{kerbe_0}$. In this, the notch 32 is provided on an axial edge 33 of the platform 27, wherein an opening 34 as a relief drilling 35 is located opposite. The relief drilling 35 is distanced from the edge 33 in such a way that the amount of the distance corresponds to a maximum permissible crack length $a_{kerbe_{zul}}$ explained later.

Radially on the inside a monitoring area 37 is located adjacent to the hub 36 of the rotor disk 19, in which during the running of the gas turbine 1 critical stresses can occur.

The weak spot 31 which is located in the inspection area 29 uncritical for the function of the rotor 3 is proportionally comparable in size and effect with a defect 41 being assumed in the monitoring area 37. Furthermore, the stresses occurring in the inspection area 29 are proportionally comparable with stresses occurring in the monitoring area 37.

During the running of the gas turbine 1 stresses and stress collectives can occur at the weak spot 31, and should the occasion arise with the presence of a defect 41, which can each lead at these points to a crack propagation.

For reasons of operating reliability the weak spot 31 must be dimensioned so that a crack 40 grows out from there sooner than from an undetected defect 41.

Should during the service inspection at least one monitoring area 29 of one of the rotor disks 19 have a crack 40 as a defect 39, which extending from the weak spot 31 stops in the relief drilling 35, then it is to be assumed that in the monitoring area 37 with the presence of a defect 41 a comparable crack 45 has developed so that the condition of the rotor 3 or the rotor disk 19 is to be classed as "for checking". Then the turbine disk 19 having the uncritical defect 39 is to be checked by a more accurate inspection for which the rotor 3 is to be stripped.

Alternatively, the relief drilling could be such a distance away from the notch that enables a crack propagation which extends over several inspection intervals. The permissible crack length allocated in each case to an inspection interval, which points to the "for checking" state, must then always be compared with the actually existing measured crack length. Correspondingly, an assessment is possible of the crack propagation which occurs during the running of the gas turbine between two subsequent service inspections.

Should the check of the rotor disk 19 show no defect 43 in the monitoring area 37, then based on the uncritical defect 39 in the inspection area 29 it is to be assumed that no significant defect 41 exists in the monitoring area 37 either. Otherwise, a defect 43 would be identifiable there. Therefore, the rotor disk 19 under consideration can be reused.

Figure 4:
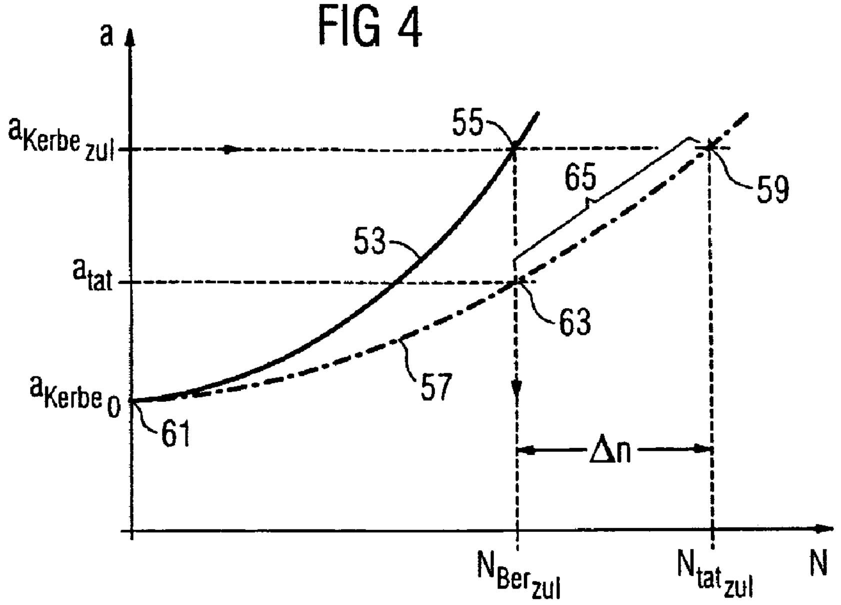
FIG. 4 shows a number of starts-crack length graph according to the invention.

FIG. 4 shows a number of starts-crack length graph which is used in the invention. On the abscissa the number N of starts of the gas turbine 1 is plotted and on the ordinate the crack length a of cracks 40 of rotor disks 19.

A characteristic curve 53 drawn in solid line shows the conservatively calculated progression of the crack length a of the crack 40 in the inspection area 29 in dependence upon the number N of starts of the gas turbine 1. By a maximum permissible crack length $a_{kerbe_{zul}}$ as a limit value, the maximum crack length a of the crack 40 inclusive of the length $a_{kerbe_0}$ of the notch 32 with which the rotor disk 19 can be operated without its condition and that of the rotor 3 being classed as "for checking" is predetermined. The characteristic curve 53 intersects the maximum permissible crack length $a_{kerbe_0}$ at the point 55. From this the permissible number of starts $N_{Ber_{zul}}$ calculated under conservative assumption can then be determined.

No later than when the calculated permissible number of starts $N_{Ber_{zul}}$ is reached, the gas turbine 1 is stripped for inspection purposes. The inspection area 29 visible from outside shows then as the case may be a crack 40 extending from the notch 32 with the actual length $a_{tat}$ which is entered on the graph as point 63 P($N_{Ber_{zul}}$, $a_{tat}$). By the coordinate P (0, $a_{kerbe_0}$) a second point 61 as an origin of a further characteristic curve 57 is fixed so that in the abscissa interval of [0, $N_{Ber_{zul}}$] the characteristic curve 57 on the basis of the fracture-mechanical properties of the material of the rotor disk 19 can be determined. The chain-dot represented characteristic curve 57 subsequently shows the crack propagation which occurs as a result of the actual stress collective. The further progression 65 of the characteristic curve 57 is then determined by extrapolation in order to then determine a point of intersection 59 with the maximum permissible crack length $a_{kerbe_{zul}}$. By this, the actual permissible number of starts $N_{tat_{zul}}$ is determined, after which the rotor 3 is to be stripped and checked for defects 43 in the critical monitoring area 37. Therefore, a comparatively accurate determination of the residual life of the rotor disks 19 is made.

The difference An between the actually permissible number of starts $N_{tat_{zul}}$ and the calculated permissible number of starts $N_{Ber_{zul}}$ is the gain in starts N of the gas turbine 1 achieved by the invention. Directly after the actually permissible number of starts $N_{tat_{zul}}$, is reached the rotor 3 is to be stripped and the rotor disks 19 and other rotor components checked for defects 43 in the critical monitoring area 37.

For each inspection interval a crack propagation indicator in the fashion of a predetermined breaking point subjected to the actual stress collective up to this point is created by the weak spot 31 by which conclusions concerning defects 43 about areas of the rotor disks 19 not visible from the outside are made possible.

The invention claimed is:

1. A rotor for a turbo-machine, comprising:

a rotor disk inspection area arranged on a low stress portion of the rotor that is visually inspectable;

a failure site arranged in the inspection area formed essentially as a notch such that the failure site is representative of a non-inspectable critical stress location of the rotor; and a hole arranged at a predetermined distance from the failure site such that the hole limits the length of a crack that initiates at the failure site, wherein the failure site is formed on an annular platform of the rotor such that circumferential loads of the rotor operatively act upon the failure site, wherein the rotor comprises a plurality of rotor disks and a tension bolt clamping the rotor disks, wherein the rotor is a single piece rotor, wherein the rotor is welded, wherein the failure site is arranged on an end face of one of the plurality of rotor disks, and wherein the rotor has a plurality of failure sites distributed on a rotor disk and the failure sites are formed differently to identify different stress levels of the rotor and a comparable crack propagation analysis.

2. The rotor as claimed in claim 1, wherein the non-inspectable critical stress location of the rotor is adjacent to a hub of the rotor disk.

3. A turbo-machine having a rotor, comprising:

a plurality of rotor disks;

a rotor disk inspection area arranged on a visually inspectable low stress portion of at least one of the rotor disks;

a failure site arranged in the inspection area formed as a notch such that the failure site is representative of a non-inspectable critical stress location of the rotor;

a hole arranged at distance from the failure site such that the hole limits the size of a crack that initiates at the failure site, wherein the failure site is formed on an annular platform of the rotor such that circumferential loads of the rotor operatively act upon the failure site, wherein the rotor comprises a plurality of rotor disks and a tension bolt clamping the rotor disks, wherein the rotor is a single piece rotor, wherein the rotor is welded, wherein the failure site is arranged on an end face of one of the plurality of rotor disks, and wherein the rotor has a plurality of failure sites distributed on a rotor disk and the failure sites are formed differently to identify different stress levels of the rotor and a comparable crack propagation analysis.

4. The turbo-machine as claimed in claim 3, wherein the turbo-machine is a compressor, a gas turbine or a steam turbine.

* * * * *